E. CHAQUETTE.
TRANSMISSION MECHANISM.
APPLICATION FILED SEPT. 21, 1916. RENEWED FEB. 21, 1918.

1,265,175.

Patented May 7, 1918.
2 SHEETS—SHEET 1.

Witness
Chas. L. Griestauer.

Inventor
Ephraiem Chaquet
By
Attorney

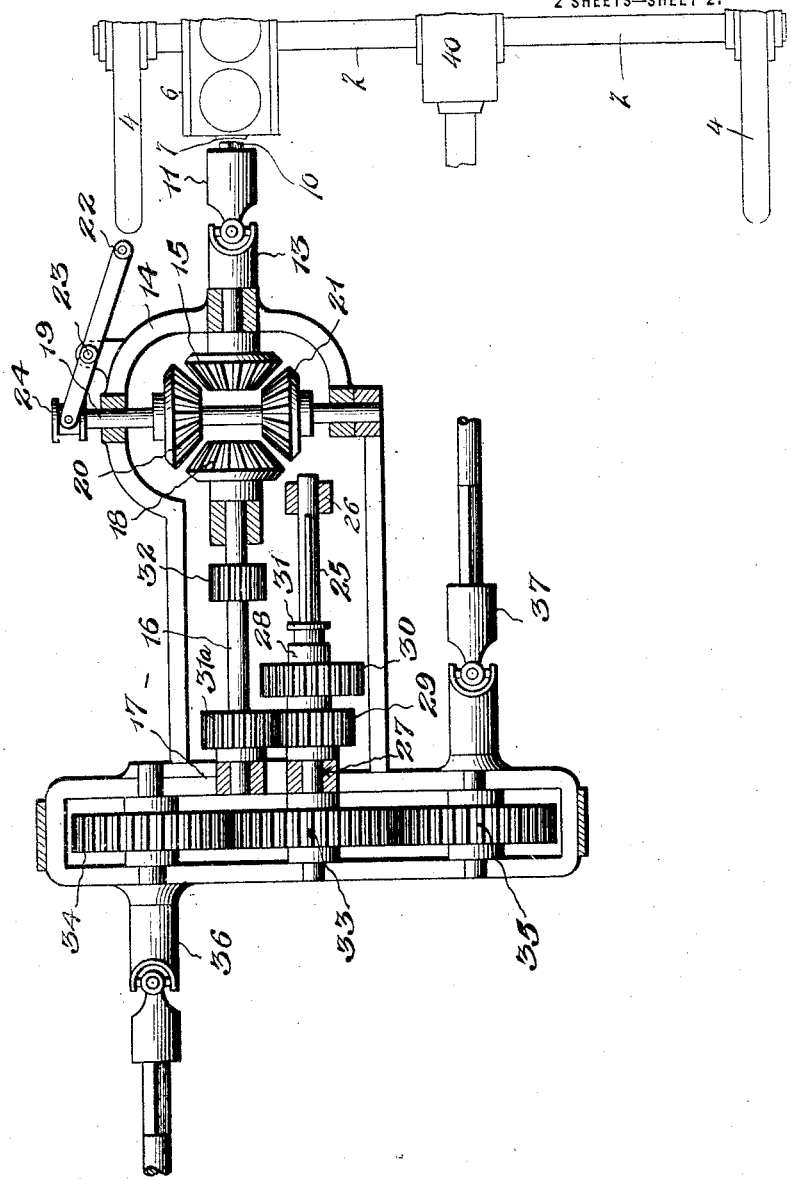

UNITED STATES PATENT OFFICE.

EPHRAIEM CHAQUETTE, OF SADDLE RIVER, NEW JERSEY, ASSIGNOR OF ONE-HALF TO JOHN RATZER, OF SADDLE RIVER, NEW JERSEY.

TRANSMISSION MECHANISM.

1,265,175.   Specification of Letters Patent.   Patented May 7, 1918.

Application filed September 21, 1916, Serial No. 121,431. Renewed February 21, 1918. Serial No. 218,605.

*To all whom it may concern:*

Be it known that I, EPHRAIEM CHAQUETTE, a citizen of the United States, residing at Saddle River, in the county of Bergen and State of New Jersey, have invented certain new and useful Improvements in Transmission Mechanism, of which the following is a specification, reference being had therein to the accompanying drawing.

This invention relates to certain improvements in motor trucks, and more particularly to that type of trucks wherein power is transmitted to both the front and rear axles.

In my prior Patent, No. 1186648, dated June 13, 1916, I have illustrated and described a truck of this character, which has proven highly efficient and satisfactory in use, and it is one of the primary objects of the present invention to still further improve upon the construction of the said patent.

In my prior patent, I have illustrated and described direct and positive driving connection for the front and rear axles of the vehicle, etc., and in that embodiment of the invention herein illustrated this connection preferably includes a worm gear drive, the said connection having associated means whereby the speed of the truck may be varied at will and whereby the movement of the truck may be reversed.

It is contemplated by the present invention to provide in operative association with a driving mechanism of the general character illustrated and described in the said patent, means whereby the movement of the truck may be reversed, and means whereby the speed of the truck in opposite directions may be varied at will.

Other improvements and novel details in the construction and arrangement of the various parts will be appreciated from the description to follow, which for a clear understanding of the invention is to be considered in connection with the accompanying drawings, forming a part hereof, wherein is disclosed a convenient and satisfactory embodiment of the invention.

In the drawings:

Fig. 2 is a top plan view of the gear mechanism enlarged.

Figure 1:
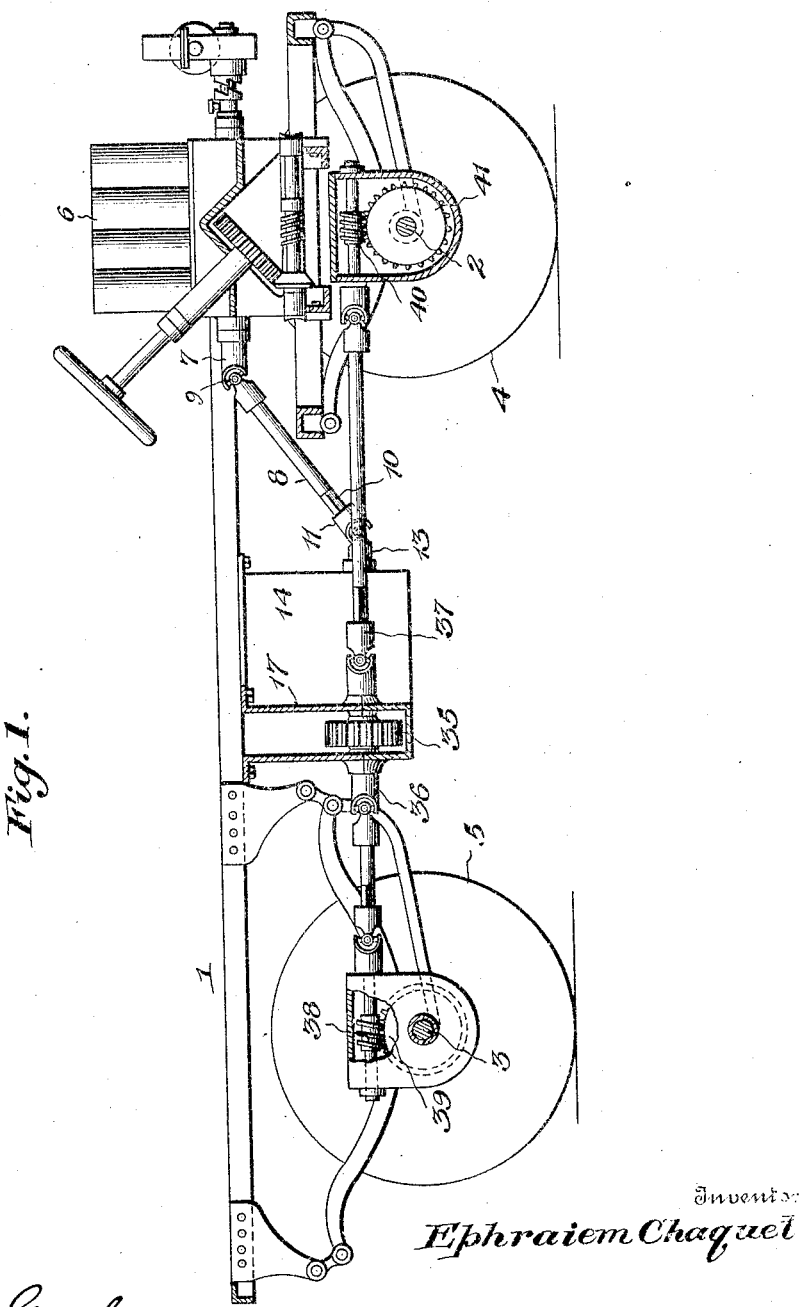
Figure 1 is a side elevation of a power driven truck with my improvements applied thereto, parts being illustrated in section.

With more particular reference to the drawings, wherein like reference numerals refer to corresponding parts throughout the several views, 1 is a framework of a truck, 2 a front axle, and 3 a rear axle, on which are mounted for rotatable movement front and rear wheels 4 and 5 respectively. The front axle is mounted for suitable swinging movement about a center axis in any desired manner, a convenient means being illustrated and described in my prior patent heretofore referred to, and not necessary to describe in detail herein. A suitable motor or engine 6 is mounted adjacent the front end of the truck in any desired manner, preferably adjacent one end of the front axle and overlying the same. The said motor has a rotatable drive shaft 7 having a flexible connection 9 with a downwardly inclined section 8, which latter has a lengthwise adjustable and flexible connection 10—11 with a horizontally extending rearward projection 13 forming a rotatable supporting shaft for a beveled gear 15 arranged within a housing or casing 14 extending longitudinally of the truck, and in substantial horizontal alinement with the shaft 13 is a gear shaft 16 suitably supported at one end within an extension 17 of the casing 14 and having at its opposite end a beveled gear 18. Extending transversely of the casing 14 and between the shafts 13 and 16 is a suitable reversing gear mechanism including a slidable and rotatable shaft 19 having mounted thereon for slidable and rotatable movement therewith bevel gears 20 and 21. In the normal position of the parts the gears 20 and 21 will be out of mesh with the gears 15 and 18 previously referred to, suitable shifting mechanism including a lever 22 being provided for adjusting the shaft 19 whereby to bring one or the other of the gears 20 and 21 into operative engagement with the gears 15 and 18. The lever 22 is pivoted intermediate its ends at 23 and connected at its rear end in any desired manner with the shaft 19 as illustrated at 24. 25 is a suitable shaft having bearings 26 and 27 in the casing 14—17 and having mounted thereon a sleeve 28 adapted to slide along the shaft 25 and to rotate therewith. Mounted upon the sleeve 28 is a relatively small gear wheel 29 and a relatively large gear wheel 30, a suitable collar 31ª being connected with the sleeve adapted to be engaged by a shifting lever or the like of any desired construction. The shaft 16 has fixed thereon a relatively large gear wheel 31 and a relatively small gear wheel 32, it being appreciated from the illustration that the speed of the sleeve 28 and connected shaft 25 will vary depending upon whether the gears 29 and 31 are in mesh, or the gears 30 and 32 are in mesh.

The front and rear axles of the vehicle are adapted to be driven through the medium of mechanism to be now described having connection with the rotatable shaft 25.

Mounted within the casing 17 are suitable gear wheels 33, 34 and 35, the gear wheel 33 being fixed upon an extension of the shaft 25, the gear wheel 34 being fixed upon a rear axle transmission shaft 36, and the gear wheel 35 being fixed upon a front axle transmission shaft 37. As in my previous patent, the transmission shafts 36 and 37 comprise a plurality of flexibly connected sections and are lengthwise adjustable. The rear axle transmission shaft has upon the rear end section thereof a worm 38 adapted to mesh with a worm gear 39 fixed upon the rear axle 3 to one side of the center of the latter. The front end section of the front axle transmission shaft 37 has a suitable worm 40 adapted to engage a worm gear 41 fixed directly upon the front axle transmission shaft 2.

It will be observed that the front and rear axle transmission shafts together with the gear shafts 16 and 25 are in substantially the same horizontal plane, and the direct worm and gear driving connection for both axles has been ascertained to be a very powerful and efficient one. Also by reason of the peculiar arrangement of parts the swinging support for the front axle is adapted to rotate about an axis in substantial vertical alinement with the center of the axle 2 and in substantial vertical alinement with the worm and gear connection 40 and 41 for said axle.

The operation will be readily understood by those skilled in the art. The motor 6 having been started in any desired manner the drive shaft 7 will be rotated when according to the desired movement i. e., forward or backward, one or the other of the gear wheels 21 or 23 will be brought into mesh with the gear wheels 15 and 18. It has been found desirable to provide for a variable speed of the truck in opposite directions, and a change in speed regardless of the direction of movement of the truck may be accomplished by bringing the gear wheels 31 and 29 into mesh, or the gear wheels 30 and 32 into mesh. The gear wheels 33, 34 and 35 being of the same size, the transmission shafts 36 and 37 will impart movement to the front and rear axles at the same speed and in the same direction according to the positioning of the reverse and changed gear mechanism previously described.

What I claim is:

1. In a motor truck, the combination of a front axle, a rear axle, a front axle transmission shaft having a gear connection with the front axle, a rear axle transmission shaft having a gear connection with the rear axle, a gear upon each transmission shaft, an intermediate drive gear interposed between and in mesh with said transmission shaft gears, a motor, a change speed gear mechanism operatively connected with the intermediate drive gear, and a reversing gear mechanism interposed between the change speed gear mechanism and the motor.

2. In a motor vehicle, the combination of front and rear axles, a motor adjacent to one end of the front axle, a drive shaft extending rearwardly from the motor, transmission shafts extending in opposite directions and in substantially the same horizontal plane, a variable speed connection between the drive shaft and said transmission shafts, the transmission shafts having a worm at the outer ends thereof, a gear fixed to each axle for direct engagement with said worm, the front axle transmission shaft being arranged substantially midway between the sides of the vehicle, and the worm engaging gear on the front axle being arranged midway of its ends, and reversing mechanism operatively associated with said variable speed gear mechanism whereby the movement of the vehicle may be reversed.

3. In a motor driven vehicle, the combination of front and rear axles, the front axle having a worm gear fixed directly thereto substantially midway of the ends thereof, and the rear axle having a worm gear fixed directly thereto to one side of the center thereof, means for supporting the front axle for swinging movement about a center in substantial vertical alinement with its worm gear, a motor supported at a point overlying the front axle to one side of the center thereof, an engine shaft projecting rearwardly from the motor, a rear axle transmission shaft having a worm to engage the worm gear to said rear axle, a front axle transmission shaft arranged to one side of the rear axle transmission shaft, and in substantial horizontal alinement therewith, said front axle transmission shaft having a worm to engage the worm gear of the front axle, and a reversible and variable speed gear connection between the engine shaft and said transmission shafts.

4. In a motor vehicle, the combination of front and rear axles, a motor adjacent to and to one side of the center of the front axle, a drive shaft extending rearwardly from the motor, transmission shafts extending in opposite directions and in substantially the same horizontal plane, a variable speed gear connection between the drive shaft and said transmission shafts, the transmission shafts having a worm at the outer ends thereof, and a gear fixed to each axle for direct engagement with said worms, the gear on the front axle being substantially midway of the ends thereof to permit swinging movement of said axle.

5. In a motor truck, the combination of front and rear axles, each having a worm engaging gear thereon, a motor arranged adjacent the front axle, a drive shaft projecting rearwardly from the motor, oppositely extending transmission shafts, the front axle transmission shaft having a worm to engage the gear of the front axle, and the rear axle transmission shaft having a worm to engage the gear on said axle, the engine shaft and said transmission shafts all being arranged in substantially the same horizontal plane, and a gear connection between the engine shaft and said transmission shafts, said gear connection being constructed and arranged whereby the speed of the axles may be varied and reversed.

6. In a motor truck, the combination of a frame or body part, front and rear axles, a motor arranged adjacent one side of the body part at the front end thereof, and a variable speed drive connection between said motor and front and rear transmission shaft, said connection permitting the front axle to swing about a central pivot.

7. In a motor truck, the combination of a frame or body part, front and rear axles, a motor arranged adjacent one side of the body part at the front end thereof, a worm gear drive means for the front and rear axle, said drive means permitting the front axle to swing about the central pivotal support, and reversing and change speed gear connection between said drive means and motor.

In testimony whereof I hereunto affix my signature in the presence of two witnesses.

EPHRAIEM CHAQUETTE.

Witnesses:
 LESLIE D. FORMAN,
 SADIE M. STURR.